United States Patent
Laly

(10) Patent No.: US 11,084,600 B2
(45) Date of Patent: Aug. 10, 2021

(54) NACELLE INLET WITH REINFORCEMENT STRUCTURE

(71) Applicant: Rohr, Inc., Chula Vista, CA (US)

(72) Inventor: Biju Balan Laly, Bangalore (IN)

(73) Assignee: Rohr, Inc., Chula Vista, CA (US)

( * ) Notice: Subject to any disclaimer, the term of this patent is extended or adjusted under 35 U.S.C. 154(b) by 316 days.

(21) Appl. No.: 16/210,174

(22) Filed: Dec. 5, 2018

(65) Prior Publication Data

US 2020/0108942 A1 Apr. 9, 2020

(30) Foreign Application Priority Data

Oct. 3, 2018 (IN) .............................. 201811037338

(51) Int. Cl.
| | |
|---|---|
| *B64D 33/02* | (2006.01) |
| *B64D 15/04* | (2006.01) |
| *F02C 7/047* | (2006.01) |
| *F02C 7/045* | (2006.01) |
| *F02C 6/08* | (2006.01) |

(52) U.S. Cl.
CPC ............. *B64D 33/02* (2013.01); *B64D 15/04* (2013.01); *F02C 6/08* (2013.01); *F02C 7/045* (2013.01); *F02C 7/047* (2013.01); *B64D 2033/0206* (2013.01); *B64D 2033/0233* (2013.01); *B64D 2033/0286* (2013.01)

(58) Field of Classification Search
CPC .................... B64D 15/04; B64D 15/02; B64D 2033/0233; B64D 33/02; B64D 2033/0206; F02C 6/08; F02C 7/045; F02C 7/047
See application file for complete search history.

(56) References Cited

U.S. PATENT DOCUMENTS

| | | | | |
|---|---|---|---|---|
| 9,950,799 | B2 * | 4/2018 | Anderson | ............... F02C 7/047 |
| 2002/0139899 | A1 | 10/2002 | Porte | |
| 2005/0006529 | A1 | 1/2005 | Moe | |
| 2010/0122868 | A1 * | 5/2010 | Chiou | ................... B64D 33/02 181/213 |
| 2010/0163678 | A1 * | 7/2010 | Gregory | ................. B64D 15/04 244/134 B |
| 2016/0257418 | A1 | 9/2016 | Aircelle | |

FOREIGN PATENT DOCUMENTS

FR          2637251 A1      4/1990

OTHER PUBLICATIONS

EP search report for EP19201345.6 dated Dec. 6, 2019.

* cited by examiner

*Primary Examiner* — Philip J Bonzell
*Assistant Examiner* — Ashesh Dangol
(74) *Attorney, Agent, or Firm* — Getz Balich LLC

(57) ABSTRACT

A nacelle inlet structure for an aircraft propulsion system. This nacelle inlet structure includes an inlet lip, a bulkhead and a reinforcement structure. The inlet lip extends circumferentially about an axial centerline. The bulkhead extends circumferentially about the axial centerline. The bulkhead is configured with the inlet lip to form a cavity axially between the inlet lip and the bulkhead. The reinforcement structure extends circumferentially about the axial centerline. The reinforcement structure is connected to and extends axially between the inlet lip and the bulkhead thereby radially dividing the cavity into an inner sub-cavity and an outer sub-cavity.

19 Claims, 8 Drawing Sheets

NACELLE INLET WITH REINFORCEMENT STRUCTURE

This application claims priority to Indian Patent Application No. 201811037338 filed Oct. 3, 2018, which is hereby incorporated herein by reference in its entirety.

BACKGROUND

1. Technical Field

This disclosure relates generally to an aircraft propulsion system and, more particularly, to an inlet structure for an aircraft propulsion system nacelle.

2. Background Information

A modern aircraft propulsion system typically includes a nacelle providing an aerodynamic housing for a gas turbine engine. The nacelle includes an inlet structure configured to direct incoming air into the gas turbine engine. Various inlet structure configurations and systems therefor are known in the art. While these known inlet structure configurations and systems have various benefits, there is still room in the art for improvement.

SUMMARY OF THE DISCLOSURE

According to an aspect of the present disclosure, a nacelle inlet structure is provided for an aircraft propulsion system. The nacelle inlet structure includes an inlet lip, a bulkhead and a reinforcement structure. The inlet lip extends circumferentially about an axial centerline. The bulkhead extends circumferentially about the axial centerline. The bulkhead is configured with the inlet lip to form a cavity axially between the inlet lip and the bulkhead. The reinforcement structure extends circumferentially about the axial centerline. The reinforcement structure is connected to and extends axially between the inlet lip and the bulkhead thereby radially dividing the cavity into an inner sub-cavity and an outer sub-cavity.

According to another aspect of the present disclosure, another nacelle inlet structure is provided for an aircraft propulsion system. This nacelle inlet structure includes an inlet lip, a bulkhead and reinforcement rib. The inlet lip extends circumferentially about an axial centerline. The bulkhead extends circumferentially about the axial centerline. The bulkhead is configured with the inlet lip to form a cavity axially between the inlet lip and the bulkhead. The reinforcement rib extends circumferentially about the axial centerline. The reinforcement rib projects axially out from an interior surface of the inlet lip to an end that is attached to the bulkhead.

According to still another aspect of the present disclosure, another nacelle inlet structure is provided for an aircraft propulsion system. This nacelle inlet structure includes a monolithic inlet lip structure and a bulkhead. The monolithic inlet lip structure extends circumferentially about an axial centerline. The monolithic inlet lip structure includes an inlet lip and a reinforcement structure. The bulkhead extends circumferentially about the axial centerline. The bulkhead is configured with the inlet lip to form a cavity axially between the inlet lip and the bulkhead. The reinforcement structure projects axially out from the inlet lip through the cavity to the bulkhead. The nozzle projects axially out from the bulkhead into the cavity and is positioned radially below the reinforcement structure.

The reinforcement rib may radially divide the cavity into an inner sub-cavity and an outer sub-cavity.

An opening in the reinforcement rib may fluidly couple the inner sub-cavity with the outer sub-cavity.

A deflector may be included and configured to direct gas flowing within the inner sub-cavity through the opening and into the outer sub-cavity.

A nozzle may be included and configured to direct gas into the inner sub-cavity.

The inlet lip and the reinforcement structure may be formed together as a monolithic body.

The reinforcement structure may be configured to rigidly tie the inlet lip and the bulkhead together.

The reinforcement structure may include a rib connected to and projecting axially out from an interior surface of the inlet lip.

A surface of the rib may be adjacent and contiguous with the interior surface of the inlet lip.

The reinforcement structure may include a flange mounted to the bulkhead.

The rib may project axially out from the interior surface of the inlet lip to the flange.

The flange may be abutted axially against the bulkhead.

The rib may extend circumferentially about the axial centerline between opposing rib ends. The reinforcement structure may also include a deflector projecting radially inward from one of the opposing rib ends.

The deflector may be perforated.

The reinforcement structure may include a deflector configured to direct air flowing within the inner sub-cavity radially through an opening in the reinforcement structure and into the outer sub-cavity.

The deflector may be perforated.

The inlet lip may include an inner lip skin and an outer lip skin. The cavity may extend axially along the axial centerline between a forward end of the inlet lip and the bulkhead. The cavity may extend radially between the inner lip skin and the outer lip skin. The cavity may extend circumferentially about the axial centerline.

The foregoing features and the operation of the invention will become more apparent in light of the following description and the accompanying drawings.

DETAILED DESCRIPTION

Figure 1:
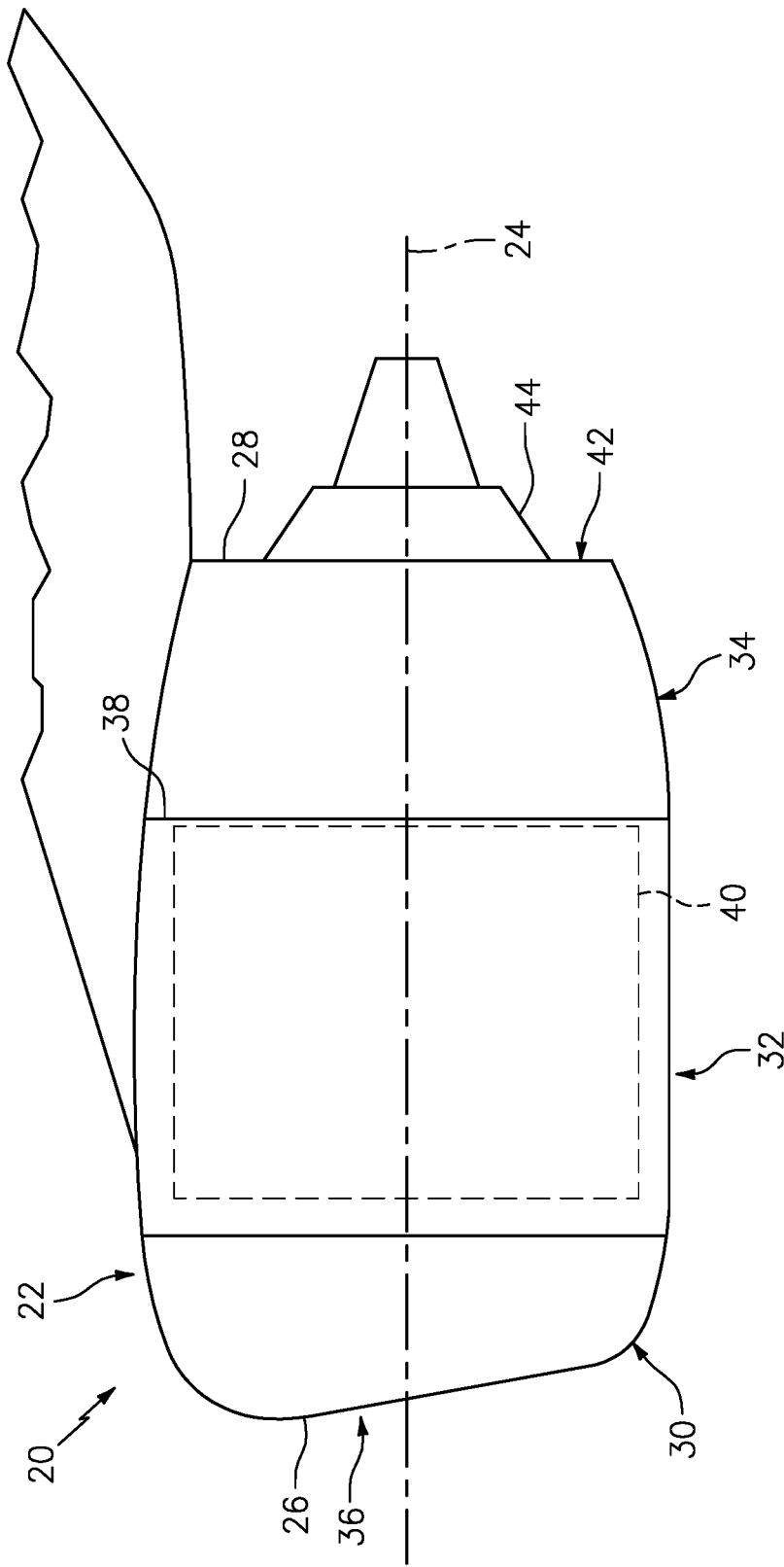
FIG. 1 is a side illustration of an aircraft propulsion system, in accordance with various embodiments.

FIG. 1 illustrates an aircraft propulsion system 20 for an aircraft such as, but not limited to, a commercial airliner. The propulsion system 20 includes a nacelle 22 and a gas turbine engine. This gas turbine engine may be configured as a high-bypass turbofan engine. Alternatively, the gas turbine engine may be configured as any other type of gas turbine engine capable of propelling the aircraft during flight.

The nacelle 22 is configured to house and provide an aerodynamic cover for the gas turbine engine. An outer structure of the nacelle 22 extends along a nacelle axial centerline 24 between a nacelle forward end 26 and a nacelle aft end 28. The nacelle 22 of FIG. 1 includes a nacelle inlet structure 30, one or more fan cowls 32 (one such cowl visible in FIG. 1) and a nacelle aft structure 34, which may be configured as part of or include a thrust reverser system.

As described below in further detail, the inlet structure 30 is disposed at the nacelle forward end 26. The inlet structure 30 is configured to direct a stream of air through an inlet opening 36 (see also FIG. 2) at the nacelle forward end 26 and into a fan section of the gas turbine engine.

The fan cowls 32 are disposed axially between the inlet structure 30 and the aft structure 34. Each fan cowl 32 of FIG. 1, in particular, is disposed at an aft end 38 of a stationary portion of the nacelle 22, and extends forward to the inlet structure 30. Each fan cowl 32 is generally axially aligned with a fan section of the gas turbine engine. The fan cowls 32 are configured to provide an aerodynamic covering for a fan case 40, which circumscribes the fan section and partially forms an outer peripheral boundary of a bypass flowpath of the propulsion system 20.

The term "stationary portion" is used above to describe a portion of the nacelle 22 that is stationary during propulsion system operation (e.g., during takeoff, aircraft flight and landing). However, the stationary portion may be otherwise movable for propulsion system inspection/maintenance; e.g., when the propulsion system 20 is non-operational. Each of the fan cowls 32, for example, may be configured to provide access to components of the gas turbine engine such as the fan case 40 and/or peripheral equipment configured therewith for inspection, maintenance and/or otherwise. In particular, each of the fan cowls 32 may be pivotally mounted with the aircraft propulsion system 20 by, for example, a pivoting hinge system. The present disclosure, of course, is not limited to the foregoing fan cowl 32 configurations and/or access schemes.

The aft structure 34 of FIG. 1 is disposed at the nacelle aft end 28. The aft structure 34 is configured to form a bypass nozzle 42 for the bypass flowpath with an inner structure 44 of the nacelle 22; e.g., an inner fixed structure (IFS). The aft structure 34 may include one or more translating sleeves (one such sleeve visible in FIG. 1) for the thrust reverser system. The present disclosure, however, is not limited to such a translatable sleeve thrust reverser system, or to an aircraft propulsion system with a thrust reverser system.

Figure 2:
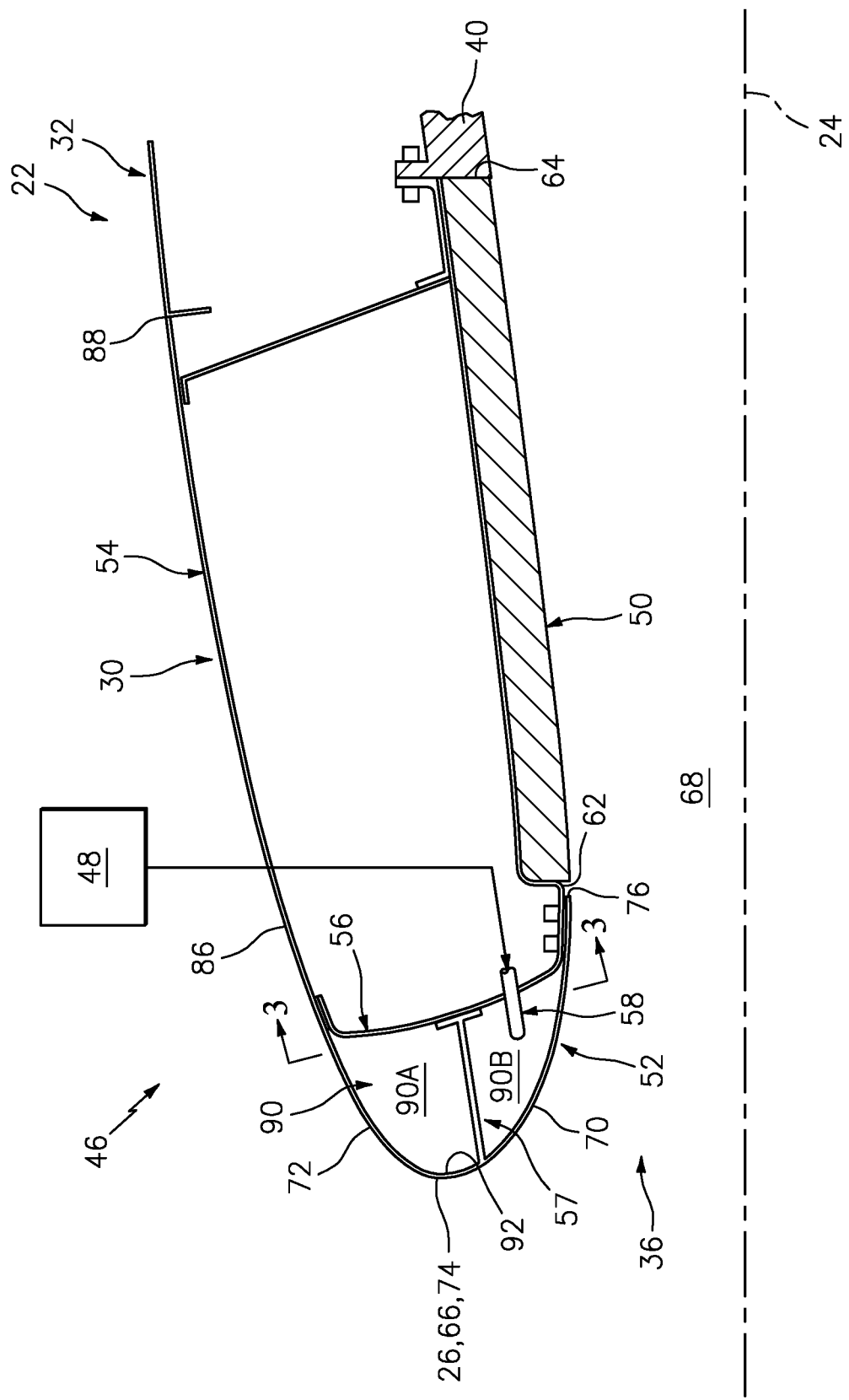
FIG. 2 is a side sectional illustration of a forward portion of a nacelle for the aircraft propulsion system, in accordance with various embodiments.

FIG. 2 is a schematic side sectional illustration of an assembly 46 of the propulsion system 20 of FIG. 1. This propulsion system assembly 46 includes the inlet structure 30, the fan cowls 32 (one shown) and the fan case 40. The propulsion system assembly 46 also includes a thermal anti-icing system 48, which may be configured to receive relatively hot compressed bleed air from a compressor section (e.g., a high pressure compressor (HPC) section or a low pressure compressor (LPC) section) of the gas turbine engine.

The inlet structure 30 in FIG. 2 includes a tubular inner barrel 50, an annular inlet lip 52, a tubular outer barrel 54, at least one forward (e.g., annular) bulkhead 56 and a tubular reinforcement structure 57. The inlet structure 30 also includes at least one nozzle 58 for the thermal anti-icing system 48.

The inner barrel 50 extends circumferentially around the axial centerline 24. The inner barrel 50 extends axially along the axial centerline 24 between an inner barrel forward end 62 and an inner barrel aft end 64.

The inner barrel 50 may be configured to attenuate noise generated during propulsion system operation and, more particularly for example, noise generated by rotation of the fan. The inner barrel 50 of FIG. 2, for example, includes at least one tubular acoustic panel or an array of arcuate acoustic panels arranged around the axial centerline 24. Each acoustic panel may include a porous (e.g., honeycomb) core bonded between a perforated face sheet and a non-perforated back sheet, where the perforated face sheet faces radially inward and provides an outer boundary for an axial portion of the gas path. Of course, various other acoustic panel types and configurations are known in the art, and the present disclosure is not limited to any particular ones thereof.

The inlet lip 52 forms a leading edge 66 of the nacelle 22 as well as the inlet opening 36 to the gas path 68. The inlet lip 52 has a cupped (e.g., generally U-shaped) cross-sectional geometry, which extends circumferentially as an annulus around the axial centerline 24. The inlet lip 52 includes an inner lip skin 70 and an outer lip skin 72, which skins 70 and 72 may be formed together from a generally contiguous sheet material. Examples of such sheet material include, but are not limited to, metal (e.g., aluminum (Al) or titanium (Ti) sheet metal) or composite material (e.g., fiber-reinforcement within a polymer matrix).

The inner lip skin 70 extends axially from an intersection 74 with the outer lip skin 72 at the nacelle forward end 26 to the inner barrel 50, which intersection 74 may be at an axially forwardmost point on the inlet lip 52. An aft end 76 of the inner lip skin 70 is attached to the forward end 62 of the inner barrel 50 with, for example, one or more fasteners; e.g., rivets, bolts, etc. The inner lip skin 70 may also or alternatively be bonded (e.g., welded, brazed, adhered, etc.) to the inner barrel 50. Of course, the present disclosure is not limited to any particular attachment techniques between the inlet lip 52 and the inner barrel 50.

The outer lip skin 72 extends axially from the intersection 74 with the inner lip skin 70 at the nacelle forward end 26 to the outer barrel 54.

The outer barrel 54 has a tubular outer barrel skin 86 that extends circumferentially around the axial centerline 24. The outer barrel skin 86 extends axially along the axial centerline 24 between the inlet lip 52 and, more particularly, the outer lip skin 72 and an aft end 88 of the outer barrel 54.

The outer barrel 54 and its skin 86 may be formed integrally with the outer lip skin 72 and, more particularly, the entire inlet lip 52 as shown in FIG. 2. The inlet lip 52 and the outer barrel 54, for example, may be formed from a monolithic skin such as, for example, a formed piece of sheet metal or molded (e.g., non-metallic) composite material; e.g., fiber reinforcement within a polymer matrix. Such a monolithic skin may extend longitudinally from the aft end 76 of the inner lip skin 70 to the aft end 88 of the outer barrel 54. This monolithic skin therefore integrally includes the inner lip skin 70, the outer lip skin 72 as well as the outer barrel skin 86. In such embodiments, the monolithic skin may be formed as a full hoop body, or circumferentially segmented into arcuate (e.g., circumferentially extending) bodies which are attached in a side-by-side fashion circumferentially about the axial centerline 24. The present disclosure, however, is not limited to such exemplary configurations. For example, in other embodiments, the inlet lip 52 may be formed discrete from the outer barrel 54 where the outer lip skin 72 is discrete from the outer barrel skin 86.

The forward bulkhead 56 is configured with the inlet lip 52 to form a forward cavity 90 (e.g., annular D-duct) within the inlet lip 52. The forward bulkhead 56 of FIG. 2, in particular, is axially located approximately at (e.g., proximate, adjacent or on) the aft end 76 of the inlet lip 52. The forward bulkhead 56 may be configured as a substantially annular body, which may be continuous or circumferentially segmented. The forward bulkhead 56 is attached to and extends radially between the inner lip skin 70 and the outer lip skin 72. The forward bulkhead 56 may be mechanically fastened to the inlet lip 52 with one or more fasteners. The forward bulkhead 56 may also or alternatively be bonded and/or otherwise connected to the inlet lip 52.

Figure 3:
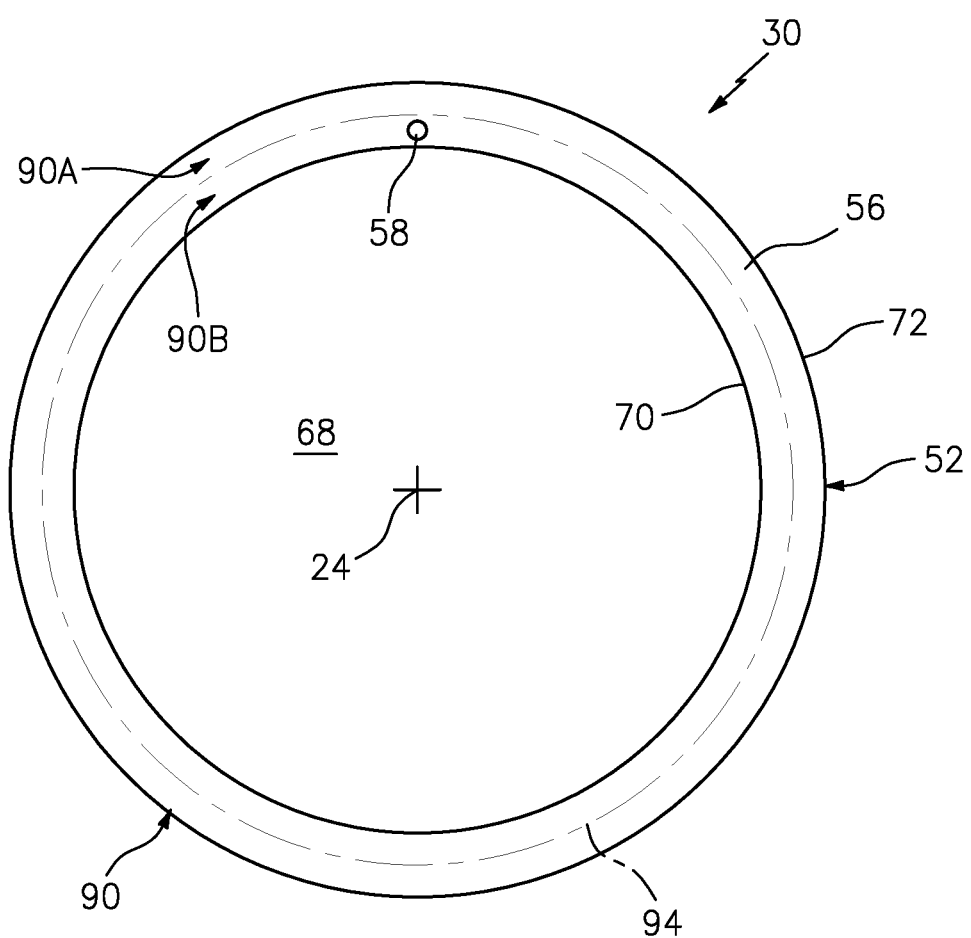
FIG. 3 is a cross-sectional illustration of an inlet structure, in accordance with various embodiments.

The cavity 90 extends axially within the inlet lip 52 from a forward end 92 of the inlet lip 52 (e.g., at the intersection 74) to the forward bulkhead 56. The cavity 90 extends radially within the inlet lip 52 from the inner lip skin 70 to the outer lip skin 72. Referring to FIG. 3, the cavity 90 also extends laterally (e.g., circumferentially) along a cavity lateral/curvilinear centerline 94 of the cavity 90 within the inlet lip 52, which curvilinear centerline 94 extends circumferentially about the axial centerline 24.

Figure 4:
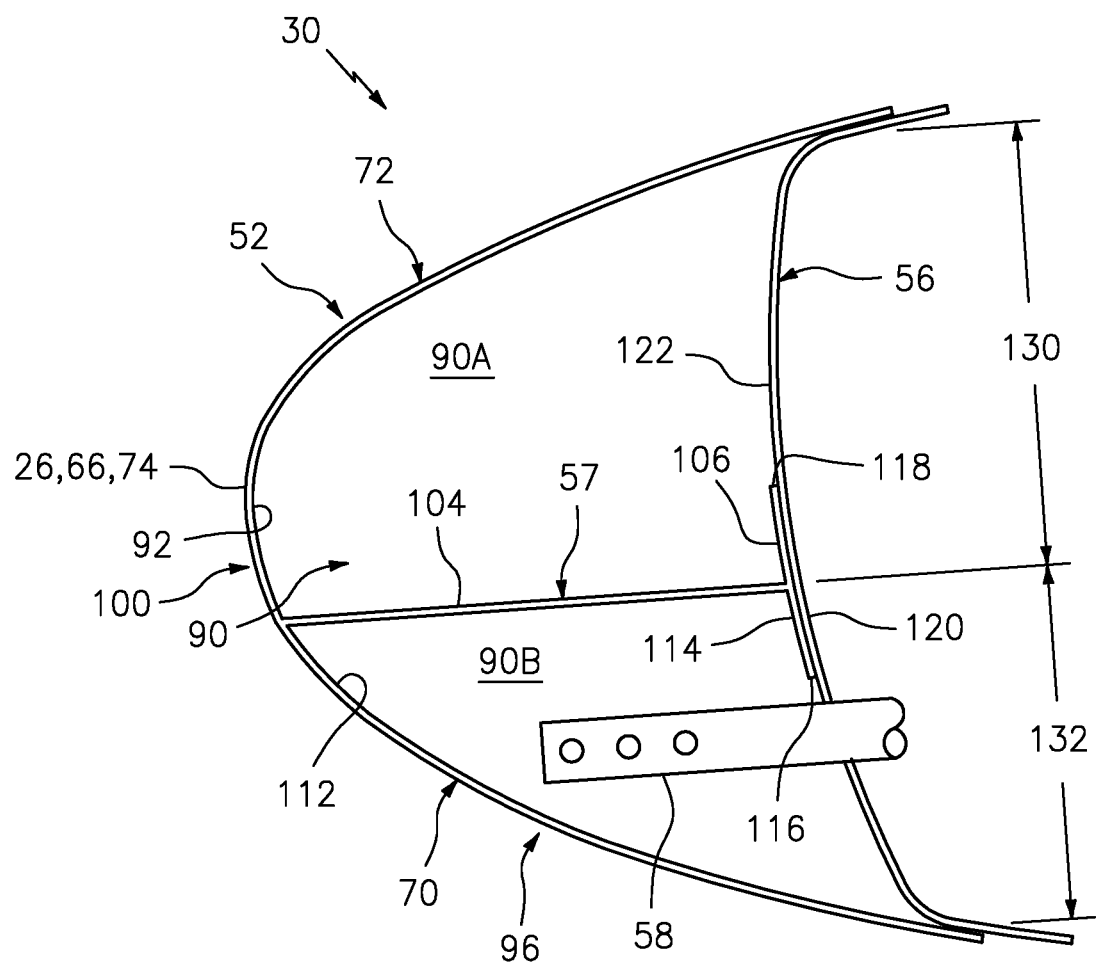
FIG. 4 is a side sectional illustration of a portion of the inlet structure, in accordance with various embodiments.

Referring to FIG. 4, the reinforcement structure 57 is configured to structurally and/or rigidly tie the inlet lip 52 and the forward bulkhead 56 together. With this configuration, the forward bulkhead 56 is operable to structurally reinforce the inlet lip 52 through the reinforcement structure 57. Similarly, the inlet lip 52 is operable to structurally reinforce the forward bulkhead 56 through the reinforcement structure 57. Such reinforcement may be particularly useful during a foreign object impact event.

During aircraft flight, a foreign object such as a bird may impact against the inlet lip 52. Under certain conditions, the foreign object may tear and pass through the inlet lip 52 after impact there-against and thereafter impact against the forward bulkhead 56. In embodiments where the reinforcement structure 57 is omitted (not shown), the impact of the foreign object against the forward bulkhead may cause radially inner and outer ends of the forward bulkhead to collapse inwards and significantly deform the bulkhead as well as structures supported thereby such as the inner and outer lip skins. By contrast, the inlet structure 30 of FIG. 4 is operable to distribute the foreign object impact force against the forward bulkhead 56 between the elements 52, 56 and 57 since the reinforcement structure 57 structurally and/or rigidly ties the elements 52 and 56 together.

The reinforcement structure 57 is also or alternatively configured to extend axially across the cavity 90 between the inlet lip 52 and the forward bulkhead 56 and thereby fluidly divide the cavity 90 into a plurality of fluidly coupled annular sub-cavities. These sub-cavities include a radial outer sub-cavity 90A and a radial inner sub-cavity 90B. The outer sub-cavity 90A is radially above the reinforcement structure 57. The inner sub-cavity 90B is radially below the reinforcement structure 57.

Figure 5:
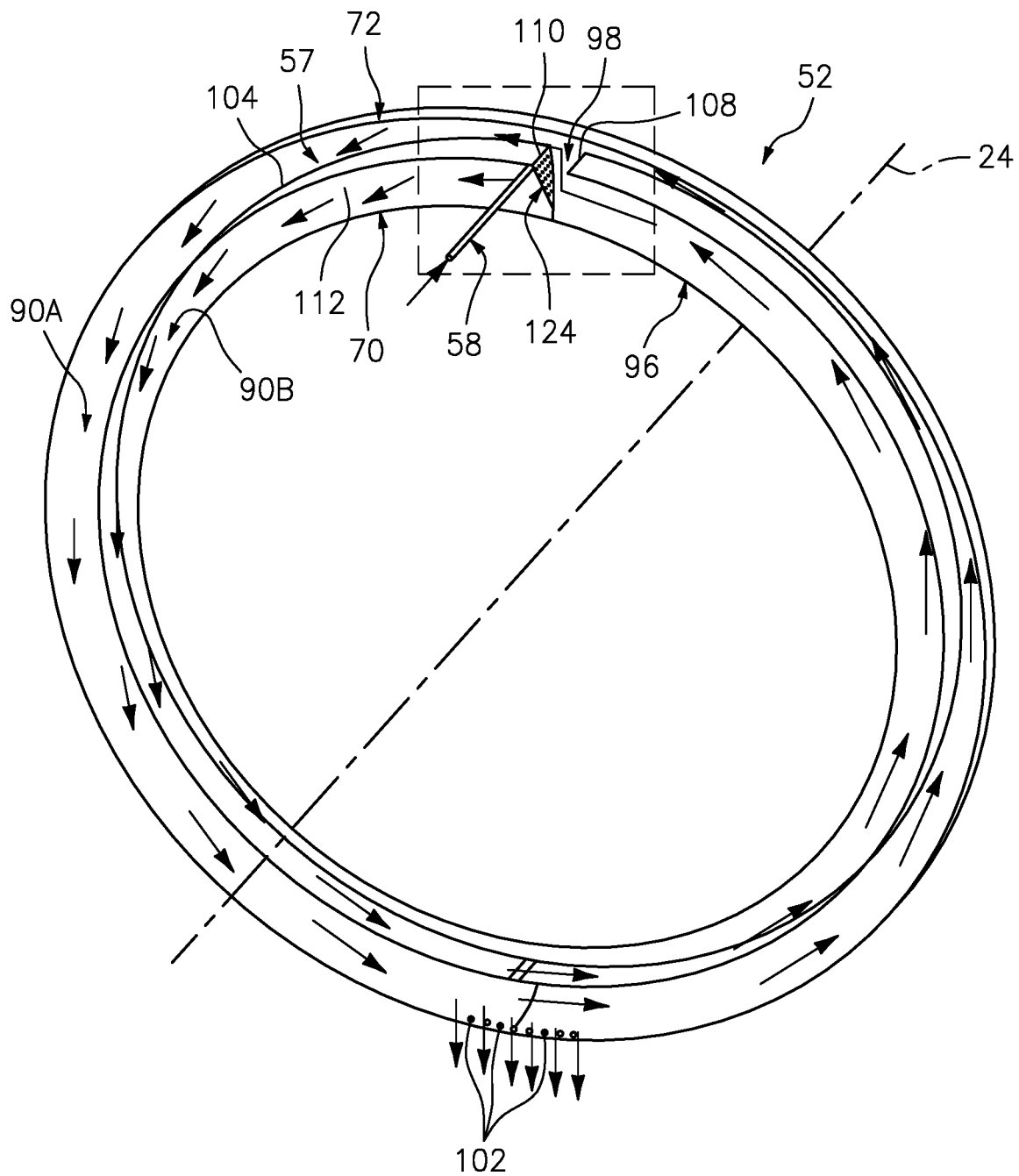
FIG. 5 is a perspective cross-sectional illustration of the inlet structure, in accordance with various embodiments.

Provision of the sub-cavities 90A and 90B may help to mitigate engine ice ingestion during aircraft operation. For example, the nozzle 58 may be positioned radially below the reinforcement structure 57 (e.g., projecting into the inner sub-cavity 90B) and inject fluid such as heated air received from the thermal anti-icing system 48 (see FIG. 2) approximately laterally into the inner sub-cavity 90B. Referring to FIG. 5, the heated air may flow through the inner sub-cavity 90B and around the axial centerline 24, thereby heating up an inner portion 96 of the inner lip skin 70. The heated air may then pass through an opening 98 in the reinforcement structure 57 and continue to flow around the axial centerline 24 and through the outer sub-cavity 90A, thereby next heating up an outer portion 100 of the inner lip skin 70 (see FIG. 4) and the outer lip skin 72 before being vented from the inlet structure 30 to a surrounding environment through vents 102 in the outer lip skin 72, for example. The reinforcement structure 57 therefore is operable to tailor airflow within the cavity 90 such that the warmest air (i.e., the air received directly from the anti-icing system 48) first passes along and heats the inner portion 96 of the inner lip skin 70 before passing along and heating a remainder of the inlet lip 52. By tailoring the airflow in this manner, the reinforcement structure 57 is operable to facilitate in the reduction or prevention of ice accumulation on the inner portion 96 of the inner lip skin 70. Typically, ice on the inner portion of an inner lip skin is most likely to be ingested by a gas turbine engine after breaking off, where such ice ingestion can lead to a decrease in engine efficiency and/or in engine damage.

The reinforcement structure 57 of FIG. 4 includes a substantially tubular reinforcement rib 104 and an annular flange 106. The rib 104 of FIG. 5 extends circumferentially and, for example, uninterrupted about the axial centerline 24 between opposing circumferential ends 108 and 110 of the rib 104. The opening 98 is thereby formed and extends circumferentially between the opposing circumferential rib ends 108 and 110. Referring again to FIG. 4, the rib 104 projects axially out from an interior surface 112 of the inlet lip 52, through the cavity 90, to a center portion of a forward surface 114 of the flange 106. The rib 104 is connected (e.g., directly) to the inlet lip 52 and, more particularly, the inner lip skin 70. The rib 104, for example, may be formed integral with the inner lip skin 70 or otherwise attached (e.g., mechanically fastened or bonded) to the inner lip skin 70. A surface of the rib 104 may therefore be adjacent and contiguous with the surface 112.

The rib 104 may be formed from impervious material. As a result, the only way for the heated air to pass from the inner sub-cavity 90B to the outer sub-cavity 90A may be through the single opening 98 shown in FIG. 5. However, in other embodiments, the rib 104 may be configured with or form one or more additional openings.

The flange 106 extends circumferentially and, for example, uninterrupted around the axial centerline 24 between opposing circumferential ends of the flange 106, which flange ends may be substantially aligned with the rib ends 108 and 110. Alternatively, the flange 106 may extend completely circumferentially about the axial centerline 24. The flange 106 of FIG. 4 extends radially between opposing radial sides 116 and 118 of the flange 106, where the rib 104 may be connected to the flange 106 approximately radially midway between the sides 116 and 118. The flange 106 is abutted axially against and is attached (e.g., directly) to the forward bulkhead 56. An aft surface 120 of the flange 106, for example, axially contacts or otherwise engages a forward surface 122 of the forward bulkhead 56, and the flange 106 is mechanically fastened and/or bonded to the forward bulkhead 56.

Figure 6:
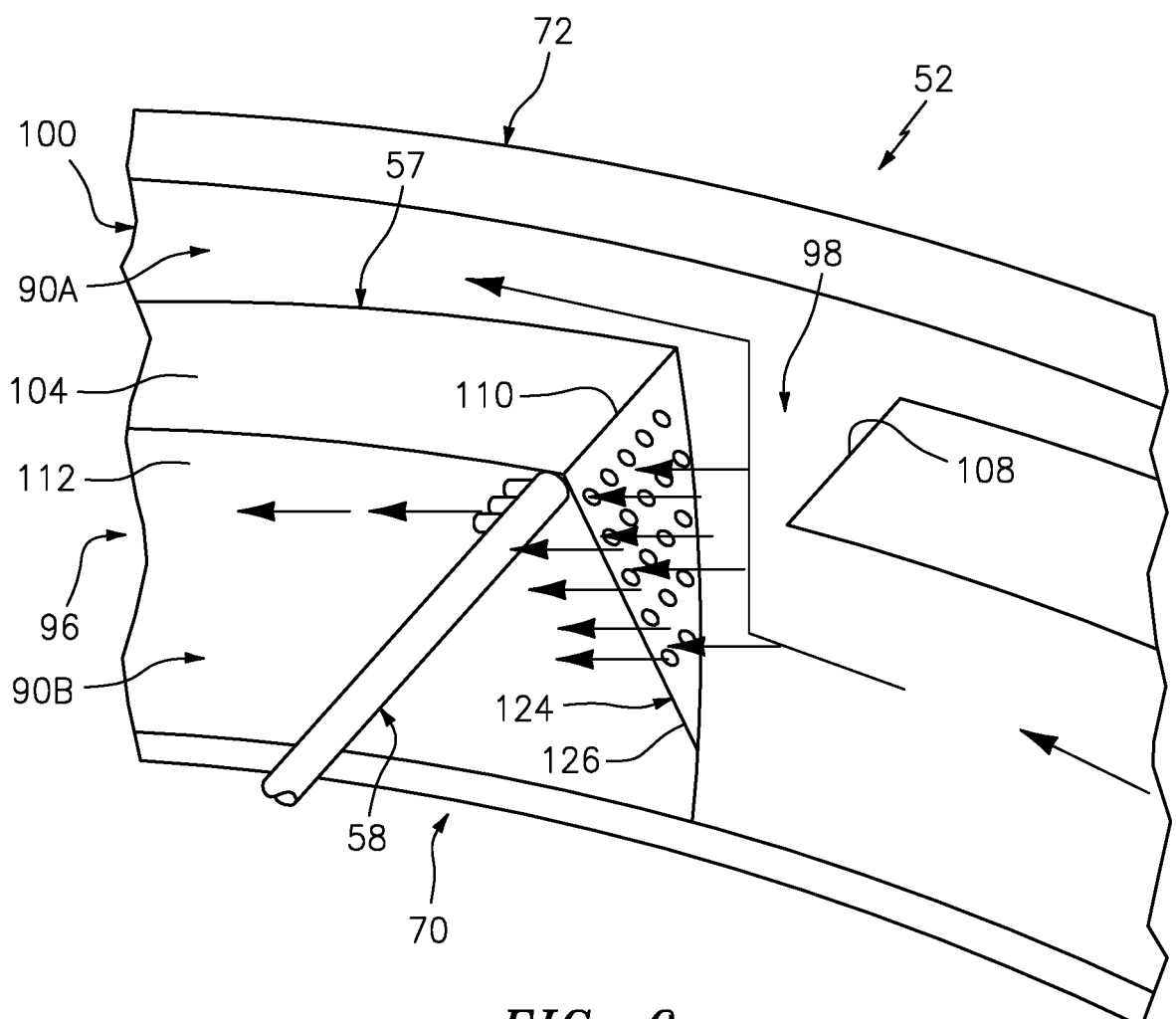
FIG. 6 illustrates an enlarged portion of the inlet structure in FIG. 5, in accordance with various embodiments.
Figure 7:
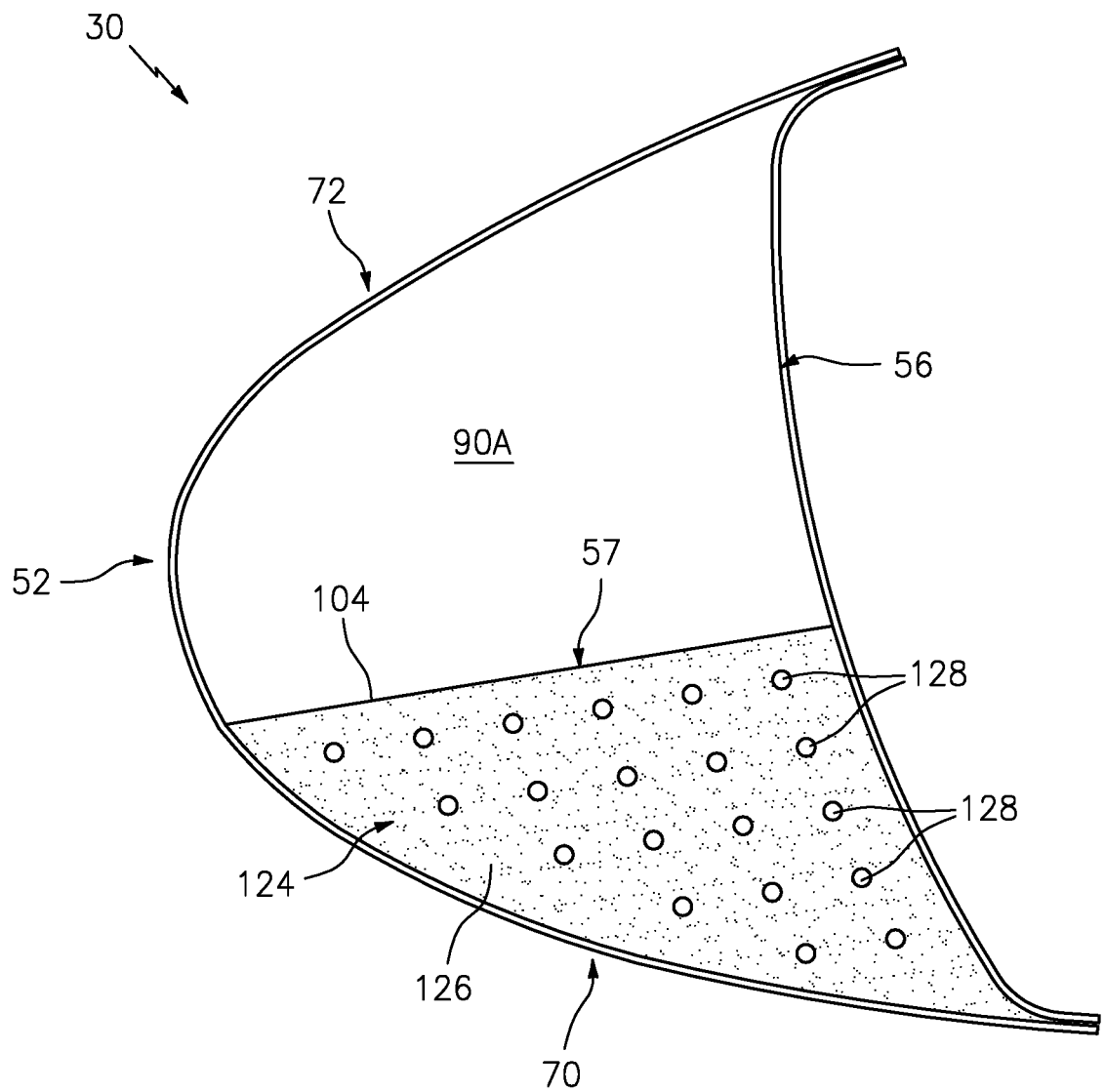
FIG. 7 is a side sectional illustration of another portion of the inlet structure, in accordance with various embodiments.

The reinforcement structure 57 of FIG. 5 also includes a deflector 124, which may be located adjacent and upstream of the nozzle 58. This deflector 124 is configured to direct air flowing within the inner sub-cavity 90B radially outward through the opening 98 and into the outer sub-cavity 90A. The deflector 124 of FIG. 6, for example, is configured as a tab 126 which projects radially inward from the downstream (relative to flow within the cavity 90) rib end 110 towards or to the inner lip skin 70. Referring to FIG. 7, the tab 126 also extends axially between the inner lip skin 70 and the forward bulkhead 56. With this configuration, the deflector 124 forms a plug (e.g., flow barrier) in the inner sub-cavity 90B; see FIG. 6. However, the deflector 124 of FIG. 6 is perforated with one or more perforations 128 (see FIG. 7) so as to allow a relatively small portion of gas to flow thereacross and thereby recirculate within the inner sub-cavity 90B. The present disclosure, however, is not limited to the foregoing exemplary perforated deflector configuration. For example, in other embodiments, the deflector 124 may be non-perforated and/or may only project partially radially and/or axially across the inner sub-cavity 90B.

In some embodiments, referring to FIG. 4, at least (or only) the inlet lip 52 and the reinforcement structure 57 may be formed integrally together (e.g., via casting, machining and/or additive manufacturing) as a monolithic body. The term "monolithic" may describe a body that is formed from a single piece of material. By contrast, a non-monolithic structure may be formed from two or more discretely formed bodies that are mechanically and/or chemically attached together.

In some embodiments, the rib 104 may have a substantially straight and linear sectional geometry when viewed in a plane parallel to the axial centerline 24; e.g., the plane of FIG. 4. However, the present disclosure is not limited to such an exemplary sectional geometry. For example, in other embodiments, the sectional geometry of the rib 104 may be slightly curved.

The reinforcement structure 57 may be positioned radially along the forward bulkhead 56 at various positions. In the embodiments of FIG. 4, a distance 130 between an outer end of the bulkhead 56 and an interface between the rib 104 and the flange 106 is greater than a distance 132 between an inner end of the bulkhead 56 and the interface. However, in other embodiments, the distances 130 and 132 may be exactly or substantially (+/-2%) equal.

Figure 8:
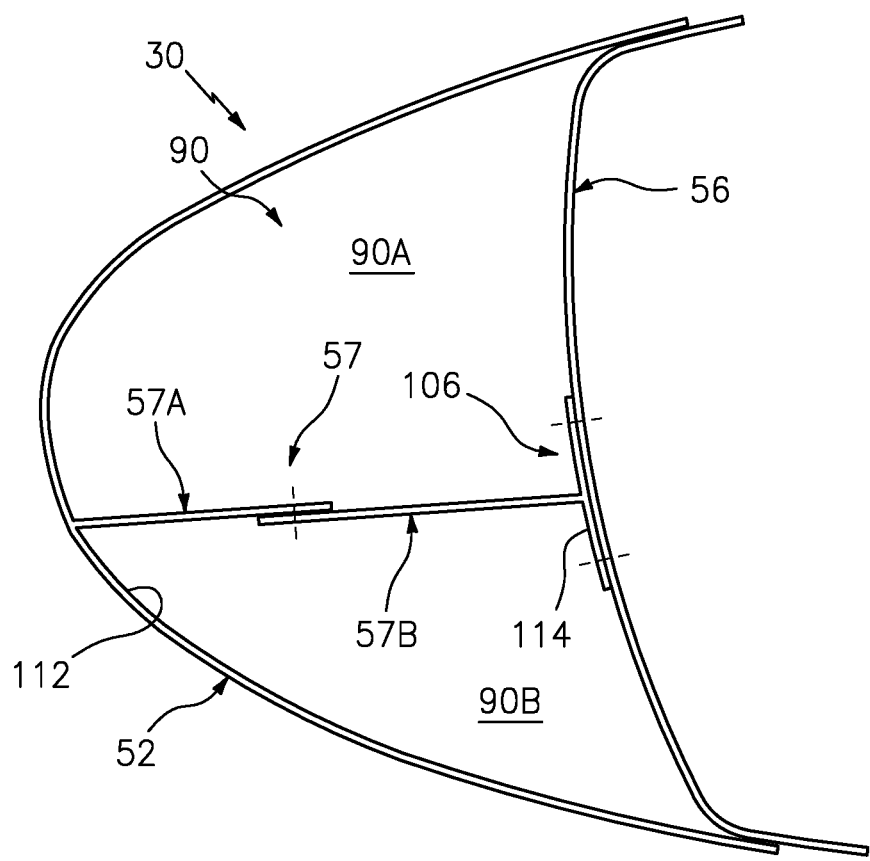
FIG. 8 is a side sectional illustration of a portion of another inlet structure, in accordance with various embodiments.

In some embodiments, the reinforcement structure 57 may be a monolithic body as illustrated in FIGS. 4 and 5. In other embodiments, referring to FIG. 8, the reinforcement structure 57 may include two or more (e.g., axial, annular) segments 57A and 57B. The forward segment 57A may be formed integral with (or discretely formed and then attached to) the inlet lip 52, and may project axially out from the interior surface 112 into the cavity 90 to an aft distal end. The aft segment 57B may be formed integral with (or discretely formed and then attached to) the flange 106, and may project axially out from the forward surface 114 into the cavity 90 to a forward distal end. The forward segment 57A is attached (e.g., mechanically fastened and/or bonded) to the aft segment 57B at an interface proximate the distal ends.

Figure 9:
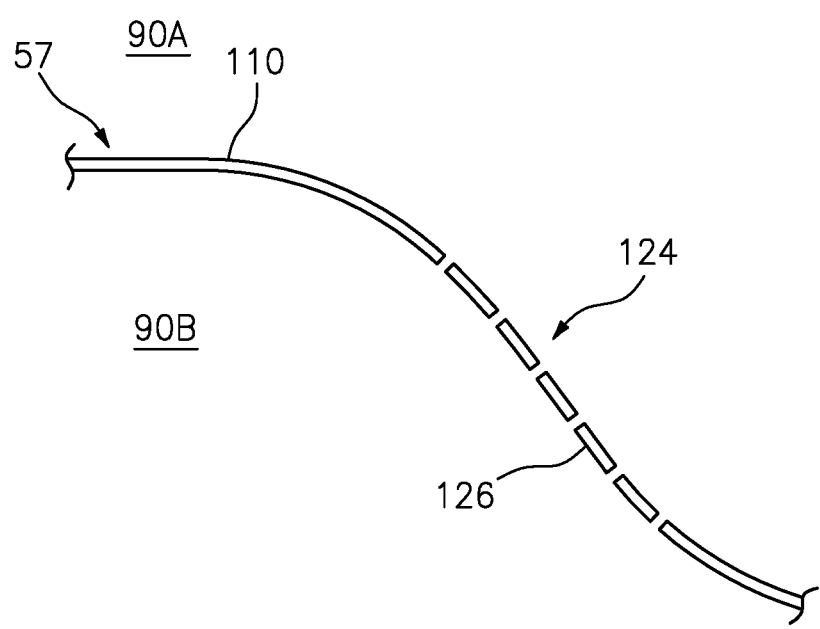
FIG. 9 is a cross-sectional illustration of a portion of still another inlet structure, in accordance with various embodiments.

In some embodiments, the deflector 124 may be configured as a flat and planar deflector as illustrated in FIG. 5. In other embodiments, referring to FIG. 9, the deflector may be configured as a curved or otherwise non-planar deflector.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A nacelle inlet structure for an aircraft propulsion system, comprising:
   an inlet lip extending circumferentially about an axial centerline;
   a bulkhead extending circumferentially about the axial centerline, the bulkhead configured with the inlet lip to form a cavity axially between the inlet lip and the bulkhead; and
   a reinforcement structure extending circumferentially about the axial centerline, the reinforcement structure connected to and extending axially between the inlet lip and the bulkhead thereby radially dividing the cavity into an inner sub-cavity and an outer sub-cavity;
   the reinforcement structure comprising a rib connected to the inlet lip, the rib projecting axially out from an interior surface of the inlet lip in a direction axially towards the bulkhead.

2. The nacelle inlet structure of claim 1, wherein the inlet lip and the reinforcement structure are formed together as a monolithic body.

3. The nacelle inlet structure of claim 1, wherein the reinforcement structure is configured to rigidly tie the inlet lip and the bulkhead together.

4. The nacelle inlet structure of claim 1, wherein a surface of the rib is adjacent and contiguous with the interior surface of the inlet lip.

5. The nacelle inlet structure of claim 1, wherein the reinforcement structure further comprises a flange mounted to the bulkhead.

6. The nacelle inlet structure of claim 5, wherein the rib projects axially out from the interior surface of the inlet lip to the flange.

7. The nacelle inlet structure of claim 5, wherein the flange is abutted axially against the bulkhead.

8. The nacelle inlet structure of claim 1, wherein
   the rib extends circumferentially about the axial centerline between opposing rib ends; and
   the reinforcement structure further comprises a deflector projecting radially inward from one of the opposing rib ends.

9. The nacelle inlet structure of claim 8, wherein the deflector is perforated.

10. The nacelle inlet structure of claim 1, wherein the reinforcement structure comprises a deflector configured to direct air flowing within the inner sub-cavity radially through an opening in the reinforcement structure and into the outer sub-cavity.

11. The nacelle inlet structure of claim 10, wherein the deflector is perforated.

12. The nacelle inlet structure of claim 1, further comprising a nozzle configured to direct gas into the inner sub-cavity.

13. The nacelle inlet structure of claim 1, wherein
   the inlet lip includes an inner lip skin and an outer lip skin; and
   the cavity extends axially along the axial centerline between a forward end of the inlet lip and the bulkhead, the cavity extends radially between the inner lip skin and the outer lip skin, and the cavity extends circumferentially about the axial centerline.

14. A nacelle inlet structure for an aircraft propulsion system, comprising:
- an inlet lip extending circumferentially about an axial centerline;
- a bulkhead extending circumferentially about the axial centerline, the bulkhead configured with the inlet lip to form a cavity axially between the inlet lip and the bulkhead; and
- a reinforcement rib extending circumferentially about the axial centerline, the reinforcement rib projecting axially out from an interior surface of the inlet lip to an end that is attached to the bulkhead, and the reinforcement rib has a straight and linear sectional geometry as the reinforcement rib projects axially out from the interior surface towards the end.

15. The nacelle inlet structure of claim 14, wherein the reinforcement rib radially divides the cavity into an inner sub-cavity and an outer sub-cavity.

16. The nacelle inlet structure of claim 15, wherein an opening in the reinforcement rib fluidly couples the inner sub-cavity with the outer sub-cavity.

17. The nacelle inlet structure of claim 16, further comprising a deflector configured to direct gas flowing within the inner sub-cavity through the opening and into the outer sub-cavity.

18. The nacelle inlet structure of claim 15, further comprising a nozzle configured to direct gas into the inner sub-cavity.

19. A nacelle inlet structure for an aircraft propulsion system, comprising:
- a monolithic inlet lip structure extending circumferentially about an axial centerline, the monolithic inlet lip structure comprising an inlet lip and a reinforcement structure;
- a bulkhead extending circumferentially about the axial centerline, the bulkhead configured with the inlet lip to form a cavity axially between the inlet lip and the bulkhead; and
- the reinforcement structure projecting axially out from the inlet lip through the cavity to the bulkhead, and the reinforcement structure has a straight and linear sectional geometry as the reinforcement structure projects axially out from an interior surface of the inlet lip towards the bulkhead; and
- a nozzle projecting axially out from the bulkhead into the cavity and positioned radially below the reinforcement structure.

* * * * *